United States Patent [19]

Meiers

[11] 4,077,315
[45] Mar. 7, 1978

[54] CYLINDRICAL BALER CONVEYOR

[75] Inventor: Gerald Franklyn Meiers, Ottumwa, Iowa

[73] Assignee: Deere & Company, Moline, Ill.

[21] Appl. No.: 702,259

[22] Filed: Jul. 2, 1976

[51] Int. Cl.² .............................................. B30B 5/06
[52] U.S. Cl. ..................................... 100/88; 56/341; 198/814
[58] Field of Search ...................... 100/76, 88; 56/341, 56/342, 343; 198/814, 813, 817, 840, 842; 74/242.1 R

[56] References Cited

U.S. PATENT DOCUMENTS

| | | | |
|---|---|---|---|
| 798,969 | 9/1905 | Luebben | 100/88 X |
| 870,050 | 11/1907 | Robbins | 198/817 X |
| 972,884 | 10/1910 | Luebben | 100/88 |
| 2,297,573 | 9/1942 | MacDonald et al. | 198/620 X |
| 2,627,223 | 2/1953 | Berge | 100/13 |
| 3,088,581 | 5/1963 | Rostal | 198/817 |
| 3,279,587 | 10/1966 | Gray et al. | 198/817 X |
| 3,964,246 | 6/1976 | Kopaska | 100/88 X |
| 3,992,987 | 11/1976 | Sereg | 100/88 |

*Primary Examiner*—Peter Feldman

[57] ABSTRACT

In a mobile agricultural machine large cylindrical bales are formed from crop material picked up from the ground and fed to a baling zone between upper and lower bale-forming belt conveyors. In the lower generally horizontal conveyor, a plurality of side-by-side flat endless belts are trained around fixed forward and rear rollers and a belt tensioning idler roller, adjacent to but forward of and below the rear roller. A series of radially extending disks mounted on and concentric with the idler roller space the belts and control their tracking on the rollers.

6 Claims, 4 Drawing Figures

CYLINDRICAL BALER CONVEYOR

BACKGROUND OF THE INVENTION

This invention relates to endless belt conveyors as applied to agricultural machines such as large round balers and more particularly, to an improved roller for a conveyor having a plurality of side-by-side endless belts.

Conveyors in which a plurality of side-by-side flat belts are trained around a series of cylindrical rollers, one or more of which is driven so as to drive the belt through friction between the belt and roller, are well known, particularly as used in machines for forming large cylindrical bales of crop material. Such conveyor is described in U.S. Pat. No. 3,931,702 also assigned to the assignee of the present invention. As is also known it is often difficult to control the tracking of such belts which may not remain spaced on the rollers, but run to one side or the other, interfering with neighboring belts or parts of the machine, causing wear and damage to the belts and possibly interfering with the function of the conveyor.

A variety of fixed guides have been used to help control the tracking of the belts on the rollers. Typically, these are fixed rods attached to the frame of the machine, sometimes in the form of a rectangular loop straddling the belt. Disadvantages of such fixed guides are the possibility of a high wear rate on the belts from friction with the guide and also their tendency to cause troublesome buildups of crop material which readily "hairpins" around the rods.

In the past, multiple side-by-side flat belt conveyors have not been used in the lower generally horizontal conveyor of large round balers. In such an application, where typically the conveyor is short and subject to very uneven and heavy loading, control of belt tracking is particularly difficult. Conventional guides cannot be used on the upper conveying run of the belts where they would be most effective in controlling tracking because they would interfere with the conveying function. Applied to the lower return run of the conveyor they are relatively ineffective in controlling tracking and very prone to collecting trash.

SUMMARY OF THE INVENTION

Accordingly, it is an object of the present invention to provide an effective belt guide for a conveyor having a plurality of side-by-side flat belts and particularly one compatible with an environment such as that of the return run of the lower conveyor of a large round baler.

It is a feature of the invention to use a belt tensioning and guiding idler roller engaging the lower run of the conveyor. Guiding and spacing of the belts is accomplished by a series of radially extending disks mounted on and concentric with the idler roller.

Another feature of the invention is the reduction of the trash buildup problem of fixed guides. The disks, rotating with the idler roller, have a self-cleaning effect and in passing through the space between the upper and lower runs of the conveyor, the disks sweep loose material down through the belts onto the ground.

Another advantage of the invention is that because the guide disks are turning with the belts, there is less friction and hence less belt wear than with conventional guides.

Another feature is the use of disks which are thinner at their periphery than at their root. If there is any tendency for belts to climb the disk, there is less risk of belt damage than with a disk of simple cylindrical form having relatively sharp edges. This advantage is enhanced if a convex form is used for the radial surfaces of the tapered disks.

Another advantage of the tapered form is that while the disks may be closely spaced at their root so as to center and guide the belts accurately, the tapered form provides clearance so that some sideways deflection of the belts as they run onto and off the idler roller can be tolerated before rubbing of the belts on the disks occurs.

Another feature of the invention is the mounting of the guiding idler roller on a pair of swinging arms pivoted on the axis of the roller so that an optimum clearance is maintained between the rear roller and the periphery of the guiding disks whatever the adjusted position of the idler roller.

DESCRIPTION OF THE PREFERRED EMBODIMENT

The invention is embodied in a baler of the type where a large cylindrical bale of crop material is formed off the ground and discharged rearwardly after the bale is formed. The general constuction and operation of such machines is well known, a machine of the above general type, for example, being described in detail in U.S. Pat. No. 3,931,702, which has an assignee common to the present invention, and only an outline description of the conventional parts of the embodiment relevant to the present invention is given here.

The machine includes a mobile main frame indicated generally by the numeral 10 mounted on a pair of wheels 12 at opposite sides of the frame. An implement tongue 14 extends forward from the frame for connection to a pulling vehicle in the conventional manner. The frame also includes a pair of upright for-and-aft side panels or walls 16 that form the opposite sides of a baling zone or chamber.

Figure 1:
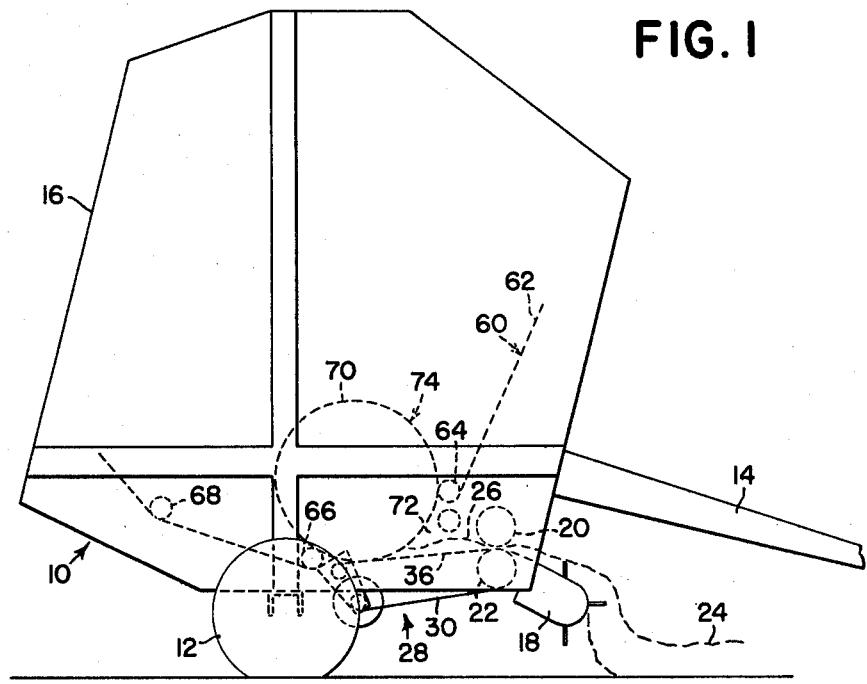
FIG. 1 is a simplified schematic side elevtion of a large round baler embodying the invention.

A pickup mechanism 18 is mounted on the main frame at the front of the machine. A pair of vertically spaced transverse oppositely rotating compressor rolls 20 and 22 extend between the opposite side panels 16 immediately to the rear of the pickup mechanism. As indicated in FIG. 1, the pickup mechanism 18 elevates the crop laying in a windrow 24 and delivers it upwardly and rearwardly to the bite of the compressor rolls 20 and 22 which engage the crop and pass it rearwardly between the rolls in a mat 26.

The mat of crop material leaving the compressor rolls is depositied on top of a lower conveyor indicated generally by the numeral 28. The lower conveyor is formed by a plurality of side-by-side flat endless belts 30, and together the belts extend substantially the full width of the baling zone between the side walls 16. The belts 30 are trained around the lower compressor roll 22, a rear roller 32 and a belt tensioning idler roller 34 located adjacent the rear roller 32 and downwardly and forwardly of it, both the rear and idler rollers also extending between the opposite side panels. The three rollers of the conveying are all parallel but the rear roller 32 lies in a horizontal plane somewhat lower than that of the lower compressor roll 22 so that the upper run 36 of the conveyor is inclined slightly downwardly.

The lower conveyor is driven through the lower compressor roll 22 so that the upper run 36 of the conveyor belts moves rearwardly, the drive system for a baler of the same general type also being described in U.S. Pat. No. 3,931,702.

The forward (lower compressor) roller 22 and the rear roller 32 are both conventional cylindrical rollers carried on fixed mountings (not shown) in the main frame 10. The idler roller 34 is carried between a pair of opposite idler arms 38 mounted on opposite sides of the frame and pivoting freely about a pivot center coaxial with the rear roller 32. A pair of conventional tension springs 40 are connected between holes 42 in each idler arm 38 towards their outer ends and a pair of opposite lugs 44 rigidly attached to the frame longitudinally to the rear of each idler arm 38 so that the springs 40 bias the idler arms 38 in a clockwise direction as viewed in FIG. 2 applying a force rearwardly and downwardly on the idler roller 34 so as to apply tension to the belts 30.

Figure 3:
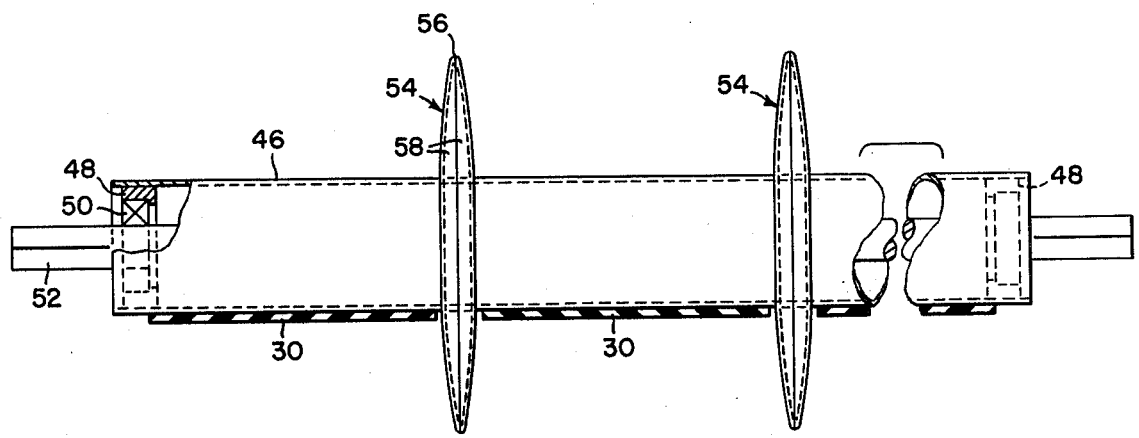
FIG. 3 is a view of the idler roller of the lower conveyor taken along line 3—3 of FIG. 2 showing the belts (in section) engaging the roller.

The idler roller 34, shown in some detail in FIG. 3, includes a hollow cylindrical body 46 in the opposite ends of which are fixed bearing housings 48 each containing a conventional antifriction bearing 50, the bearings having a central hexagonal bore. An elongated hexagonal shaft 52, of cross section to match the hexagonal bore of the bearings 50, extends through the roller and beyond it at each end, the opposite ends being attached rigidly to the idler arms 38 so that the roller 34 may rotate freely and concentrically on the bearings 50 about the shaft 52.

Spaced axially along the body 46 of the roller and attached rigidly to it is a plurality of guide disks 54, each disk extending generally radially from the body 46 of the roller and preferably being concentric with the roller. The disks are preferably mounted on the body so that the space between them is somewhat greater than the width of a flat belt 30 so that the belt may fully engage the body 46 of the roller between the disks as indicated in FIG. 3. In a preferred form, the thickness of the disks decreases progressively from a point adjacent the body 46 of the roll to their periphery 56 as shown in FIG. 3. A particular and preferred form of reducing thickness is shown in FIG. 3 — specifically one in which the opposite external radial faces of the disk are convex, the convex surfaces meeting in the substantially rounded periphery 56 as indicated in FIG. 3. In this embodiment the disks 54 are made by mating together a pair of equal and opposite concave disk halves 58 with their concavities opposing each other.

An upper bale-forming conveyor, indicated generally by the numeral 60 and shown in part in FIG. 1, is also disposed between the opposite side panels 16 and includes a plurality of side-by-side endless belts 62 which are transversely a relatively small distance apart and extend across the width of the machines. The belts 62 are trained around a plurality of rollers including a transverse lower front roller 64 which extends between the opposite side panels rearwardly of the upper compressor roll 20, a transverse lower rear roller 66 adjacent to but upward and rearward of the rear roller 32 of the lower conveyor, and a rear roller 68, both rear rollers also extending between the opposite side panels. The belts 62 are trained around these rollers (and additional rollers not shown) so that all three rollers engage the inner sides of the belts. The complete configuration of such a belt and roller system is described in greater detail in U.S. Pat. No. 3,931,702.

While the upper run 36 of the lower conveyor is driven rearwardly during the baling process as described above, the lower run of the upper conveyor which is opposite the lower conveyor is driven forwardly. The portion of the upper conveyor belts 62 extending between the lower rear roller 66 and the lower front roller 60 is the bale engaging portion 70 of the upper conveyor. The area or zone between the upper run 36 of the lower conveyor and the bale engaging portion 70 of the upper conveyor defines a baling zone identified by the numeral 72 in FIG. 1. As is apparent from FIG. 1, as the compressor rolls 20 and 22 feed the mat of material 26 into the baling zone 72, it is engaged by the two oppositely moving conveyors in such a manner that the material is rolled into a cylindrical bale 74, a partially formed bale being shown in outline in FIG. 1.

During formation, the bale is partially supported from below on the upper run 36 of the lower conveyor, while the bale engaging run 70 of the upper conveyor substantially engages the periphery of the remainder of the bale. The increasing bale size, of course, requires additional length of the bale engaging run of the upper conveyor and the necessary belt length is made available through a conventional belt takeup mechanism (not shown) elsewhere in the upper conveyor system.

It will be appreciated that during formation the growing bale 74 is constantly rolling on the upper run 37 of the lower conveyor belt 30. Because of such uncontrollable variables as the composition of the windrow 74 and uneven terrain, the forces applied to the individual belts 30 by the incoming windrow of material and the rolling bale 74 constantly vary across the width of the conveyor and across the width of each individual belt, so that there are often strong tendencies for the belts to be deflected from their true tracks. The guide disks 54, however, between each belt, separate the belts and generally guide them in their true tracks. If excessive forces cause a belt to climb or ride up one of the disk faces, the rounded surfaces of the disk (as described above) reduce the possibility of damage to the belt. The tapered form of the disks provides clearance to accommodate minor lateral deflections of the belts as they run onto and run off the idler roller 34.

Figure 2:
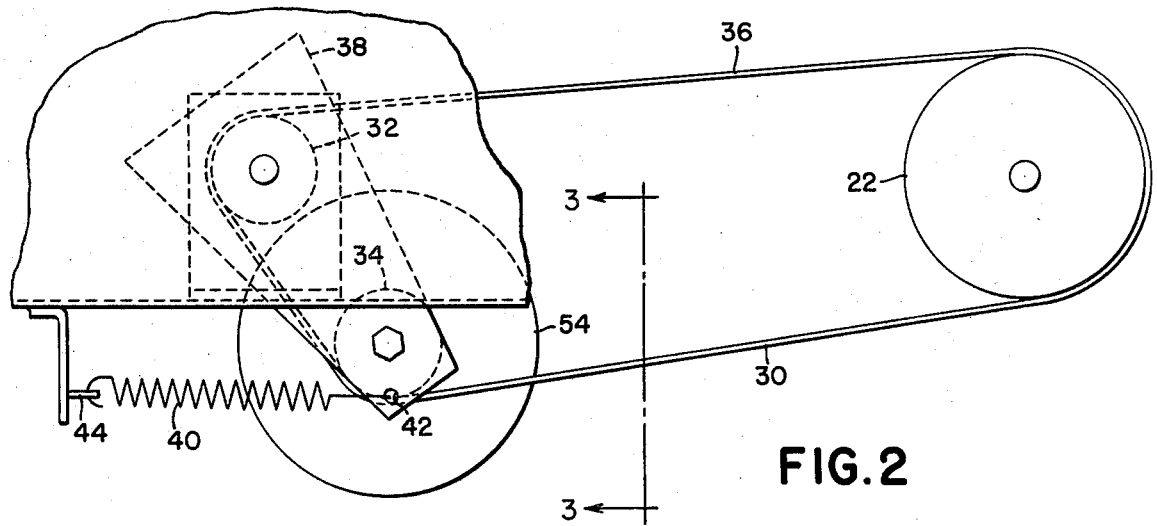
FIG. 2 is an enlarged partial view showing the lower conveyor in side elevation.

As can be seen in FIG. 2, the guide disks 54, as they rotate in effect sweep a substantial portion of the forward part of the space between the upper and lower runs of the lower conveyor passing close to the body of the rear roller 32 and tending to remove foreign material from this area and keep the conveyor system relatively clean.

Figure 4:
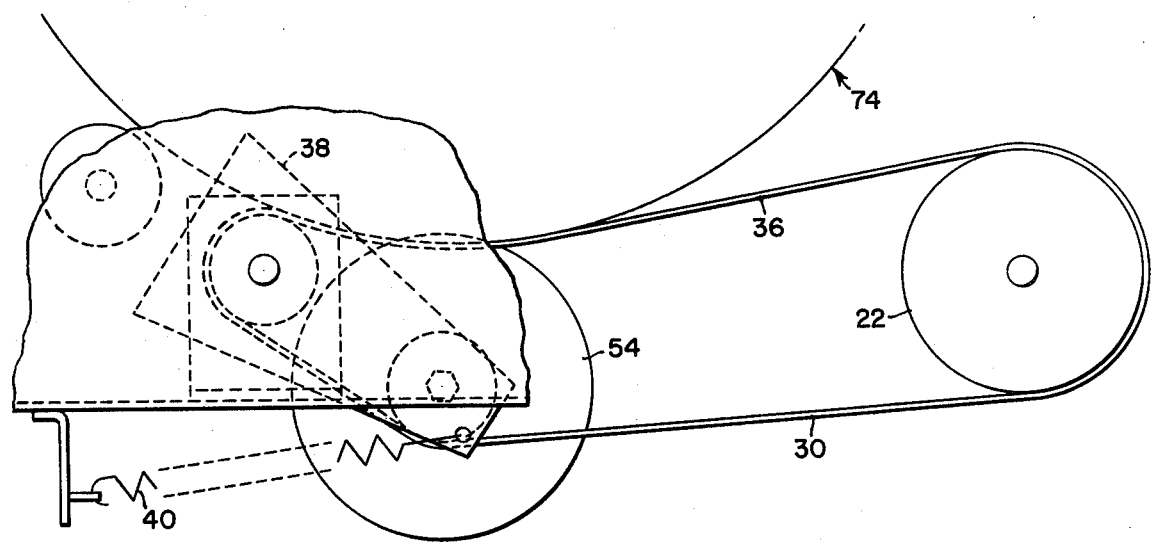
FIG. 4 is a view similar to FIG. 2 showing the condition of the lower conveyor with the upper run of the conveyor deflected by the weight of the bale.

As described above, the belts 30 of the lower conveyor are kept in tension by the springs 40 applying a rearward and downward force to the idler roller 34. As the bale 74 increases in size and weight, it is possible for the upper run 36 of the conveyor to be deflected downwards in the manner indicated in FIG. 4. This effectively increases the tension in the belts, overcoming the tension of the springs 40 and causing the idler roller 34 to swing forwards and upwards, but only until the peripheries of the disks 54 contact and partially support the bale between the belts in the upper run. The combination of the idler roller mounting configuration (allowing it to swing forwardly and upwardly) and the relatively large diameter disks 54 on the roller thus provide an advantageous automatic stop limiting the downward deflection of the upper run 36 of the lower conveyor.

I claim:

1. In a mobile agricultural machine for forming cylindrical bales having a frame and in which a bale-forming conveyor, having a plurality of side-by-side endless belts trained around a plurality of parallel rollers engages crop material so as to form cylindrical bales, the conveyor having upper and lower runs, the upper run including a fixed roller and increasingly and deflectingly supporting a forming bale adjacent said roller, the improvement comprising:

a guide roller about which the belts are trained, engaging the inside of the lower run and having a cylindrical body and a plurality of axially spaced disks carried by the body and extending radially outwards from it, the axial spacing of the disks being somewhat greater than the width of a belt so that the tracking of a belt engaging the body between the disks is at least in part guided by the disks; and mounting means for the guide roller carried by the frame and including automatic belt tensioning means biasing the guide roller generally downwards, the guide roller being located adjacent the fixed roller immediately below the forming bale so that as the upper run provides increasing and deflecting support for the forming bale, an increase in belt tension results, overcoming the biasing of the tensioning means and forcing the guide roller to move upward so that the disks pass between the belts in the upper run, the guide roller thus contacting and providing support for the growing bale.

2. The invention defined in claim 1 wherein the thickness of each disk progressively decreases as measured at successively greater diameters from adjacent the body of the roller to the periphery of the disk.

3. In a mobile agricultural machine for forming cylindrical bales of crop material having a frame and in which material is fed to a baling zone between upper and lower bale-forming belt conveyors, the lower conveyor having upper and lower runs and in which the upper run partially and increasingly supports a growing bale, an improved lower conveyor comprising:

a forward transverse roller carried by the frame;

a rear transverse roller carried by the frame and parallel to the forward roller;

an idler roller, adjacent to but forward of and below the rear roller and engaging the inside of the lower run, mounted on an adjustment means carried on the frame and including spring means biasing the idler roller downwards and rearwards along an arcuate path centered on the rear roller, the roller having a cylindrical body and a plurality of axially spaced disks carried by the body and concentric with it and extending radially outwards; and a plurality of side-by-side endless flexible belts trained around the rollers and engaging the body of the idler roller between the disks so that the tracking of the belts on the rollers is controlled at least in part by the disks, the increasing support of the growing bale provided by the upper run of the belts resulting in an increase of belt tension overcoming the spring means and forcing the idler roller to move generally upwards along its arcuate path so that the disks pass between the belts in the upper run of the conveyor, the idler roller thus contacting and partially supporting the bale.

4. The invention defined in claim 1 wherein each belt is separated from its neighboring belt by a disk.

5. The invention defined in claim 3 wherein the disks are thinner at their periphery than at an inner portion adjacent the body of the roller.

6. The invention defined in claim 3 wherein the conveyor is driven through the forward roller in a direction such that travel of the upper run of the belts is from the forward roller to the rear roller.

* * * * *

UNITED STATES PATENT OFFICE
CERTIFICATE OF CORRECTION

Patent No. 4,077,315          Dated    7 March 1978

Inventor(s) Gerald Franklyn Meiers

It is certified that error appears in the above-identified patent and that said Letters Patent are hereby corrected as shown below:

Column 6, line 32, delete "1" and insert --3--.

Signed and Sealed this

Eighth Day of August 1978

[SEAL]

Attest:

RUTH C. MASON
Attesting Officer

DONALD W. BANNER
Commissioner of Patents and Trademarks